US011288173B1

(12) United States Patent
Wang et al.

(10) Patent No.: US 11,288,173 B1
(45) Date of Patent: Mar. 29, 2022

(54) TEST CASE SELECTION

(71) Applicant: International Business Machines Corporation, Armonk, NY (US)

(72) Inventors: Jin Wang, Xi'an (CN); Lei Gao, Xian (CN); A Peng Zhang, Xian (CN); Si Er Han, Xi'an (CN); Jing James Xu, Xi'an (CN); Kai Li, Xian (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/027,780

(22) Filed: Sep. 22, 2020

(51) Int. Cl.
*G06F 9/44* (2018.01)
*G06F 11/36* (2006.01)
*G06F 16/28* (2019.01)
*G06Q 10/06* (2012.01)

(52) U.S. Cl.
CPC ...... *G06F 11/3684* (2013.01); *G06F 11/3688* (2013.01); *G06F 16/285* (2019.01); *G06Q 10/06395* (2013.01)

(58) Field of Classification Search
CPC ...... G06N 3/08; G06N 3/0472; G06K 9/6211; G06K 9/44589; G06F 11/3688; G06F 11/3684; G06F 16/285
See application file for complete search history.

(56) References Cited

U.S. PATENT DOCUMENTS

| 2011/0016457 | A1 | 1/2011 | Artzi | |
|---|---|---|---|---|
| 2016/0012317 | A1* | 1/2016 | Mayle | G06K 9/6211 382/159 |
| 2016/0210224 | A1* | 7/2016 | Cohen | G06F 9/44589 |
| 2020/0104395 | A1* | 4/2020 | Bhatia | G06N 3/0472 |
| 2020/0272857 | A1* | 8/2020 | Arcot Desai | G06N 3/08 |
| 2020/0327194 | A1* | 10/2020 | Tan | G06K 9/6254 |
| 2021/0279167 | A1* | 9/2021 | Jose | G06F 11/3688 |

FOREIGN PATENT DOCUMENTS

| CN | 101866317 B | 7/2012 |
|---|---|---|
| CN | 105528289 B | 12/2017 |

OTHER PUBLICATIONS

"Test Vectors and .Ivvect Files (Unit Test Framework Toolkit)"—LabVIEW 2013 Unit Test Framework Toolkit Help—National Instruments, Dec. 12, 2019, 4 pages, <https://zone.ni.com/reference/en-XX/help/372584F-01/lvutfconcepts/utfc_test_vector/>.
Flemstrom et al., "Similarity-based prioritization of test case automation", CrossMark, Software Qual J (2018), 29 pages, <https://link.springer.com/article/10.1007/s11219-017-9401-7>.
Wang et al., "Empirical Study of the Effects of Different Similarity Measures on Test Case Prioritization", Mathematical Problems in Engineering, vol. 2016, 12 pages, <https://www.hindawi.com/journals/mpe/2016/8343910/>.
Mell et al., "The NIST Definition of Cloud Computing", National Institute of Standards and Technology, Special Publication 800-145, Sep. 2011, 7 pages.

* cited by examiner

*Primary Examiner* — Tuan A Vu
(74) *Attorney, Agent, or Firm* — Stephen R. Yoder

(57) ABSTRACT

Test case selection methods are disclosed. A feature of a candidate test case and respective features of a set of test cases are extracted. The set of test cases is clustered into a plurality of clusters based on the respective features of the set of test cases. At least one cluster related to the candidate test case is determined from the plurality of clusters based on the feature of the candidate test case. At least one test case similar to the candidate test case is selected from a plurality of test cases included in the at least one cluster.

20 Claims, 5 Drawing Sheets

TEST CASE SELECTION

BACKGROUND

The present disclosure relates to data processing, and more specifically to test case selection.

As software is updated or changed constantly, software testing plays an important role in ensuring software quality. There are often thousands of test cases for testing software. Due to time and resource constraints, it is usually impossible to run all of the test cases in every software test.

SUMMARY

According to one embodiment of the present invention, there is provided a computer-implemented method. According to the method, one or more processors extract a feature of a candidate test case and respective features of a set of test cases. One or more processors cluster the set of test cases into a plurality of clusters based on the respective features of the set of test cases. One or more processors determine at least one cluster related to the candidate test case from the plurality of clusters based on the feature of the candidate test case. In addition, one or more processors select at least one test case similar to the candidate test case from a plurality of test cases comprised in the at least one cluster.

According to another embodiment of the present invention, there is provided a system. The system comprises a processing unit and a memory coupled to the processing unit. The memory stores instructions that, when executed by the processing unit, perform actions comprising: extracting a feature of a candidate test case and respective features of a set of test cases; clustering the set of test cases into a plurality of clusters based on the respective features of the set of test cases; determining at least one cluster related to the candidate test case from the plurality of clusters based on the feature of the candidate test case; and selecting at least one test case similar to the candidate test case from a plurality of test cases comprised in the at least one cluster.

According to yet another embodiment of the present invention, there is provided a computer program product. The computer program product is tangibly stored on a non-transient machine-readable medium and comprises machine-executable instructions. The machine-executable instructions, when executed on a device, cause the device to perform actions comprising: extracting a feature of a candidate test case and respective features of a set of test cases; clustering the set of test cases into a plurality of clusters based on the respective features of the set of test cases; determining at least one cluster related to the candidate test case from the plurality of clusters based on the feature of the candidate test case; and selecting at least one test case similar to the candidate test case from a plurality of test cases comprised in the at least one cluster.

BRIEF DESCRIPTION OF THE SEVERAL VIEWS OF THE DRAWINGS

Through the more detailed description of some embodiments of the present invention in the accompanying drawings, the above and other objects, features and advantages of the present invention will become more apparent, wherein the same reference generally refers to the same components in the embodiments of the present invention.

Throughout the drawings, same or similar reference numerals represent the same or similar elements.

DETAILED DESCRIPTION

Figure 1:
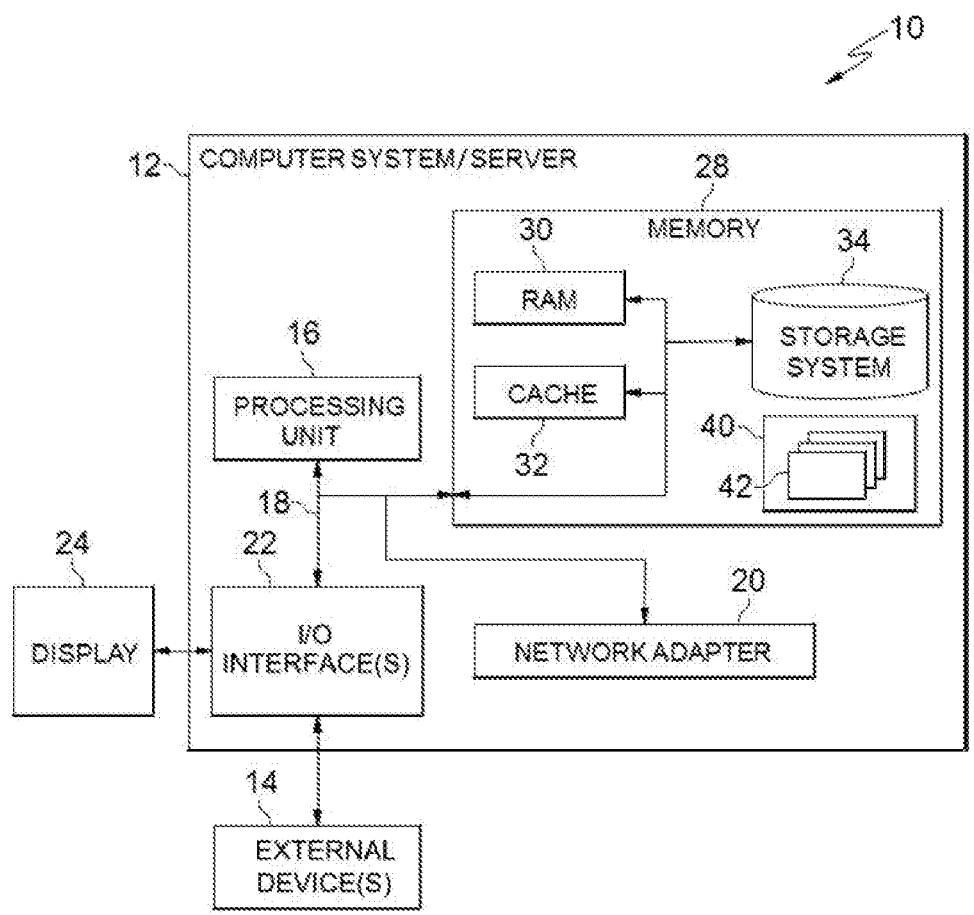
FIG. 1 depicts a cloud computing node according to an embodiment of the present invention.

Some embodiments will be described in more detail with reference to the accompanying drawings, in which the embodiments of the present invention have been illustrated. However, the present invention can be implemented in various manners, and thus should not be construed to be limited to the embodiments disclosed herein.

It is to be understood that although this document includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e. g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
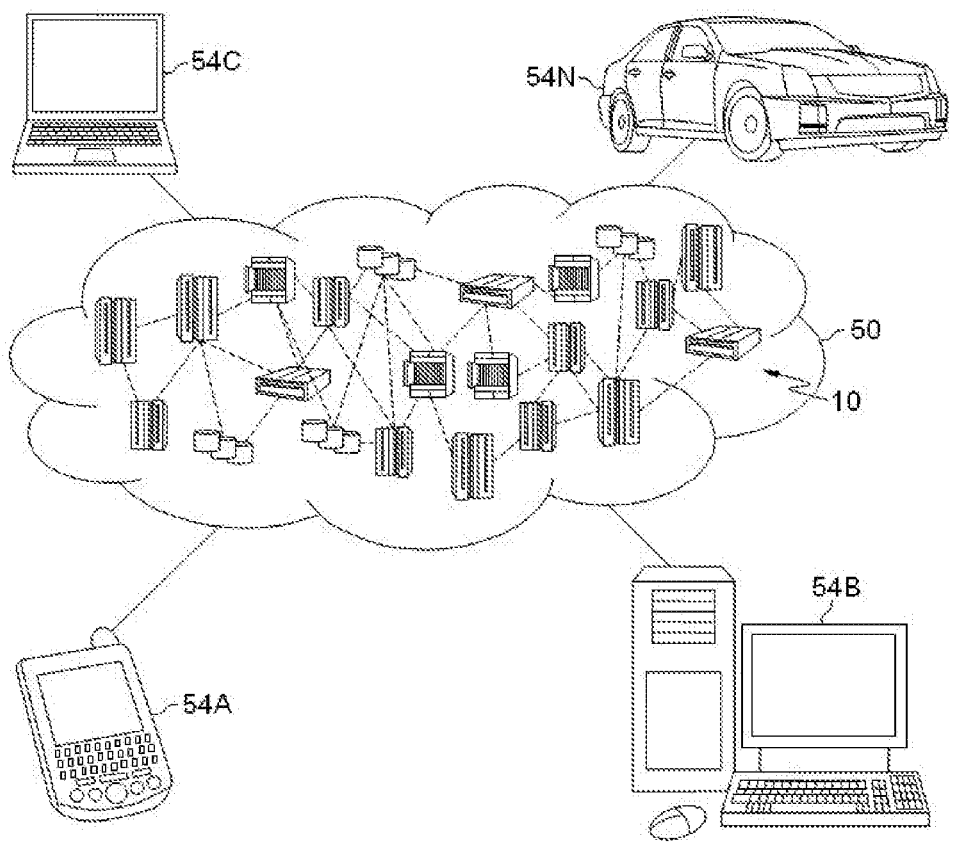
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
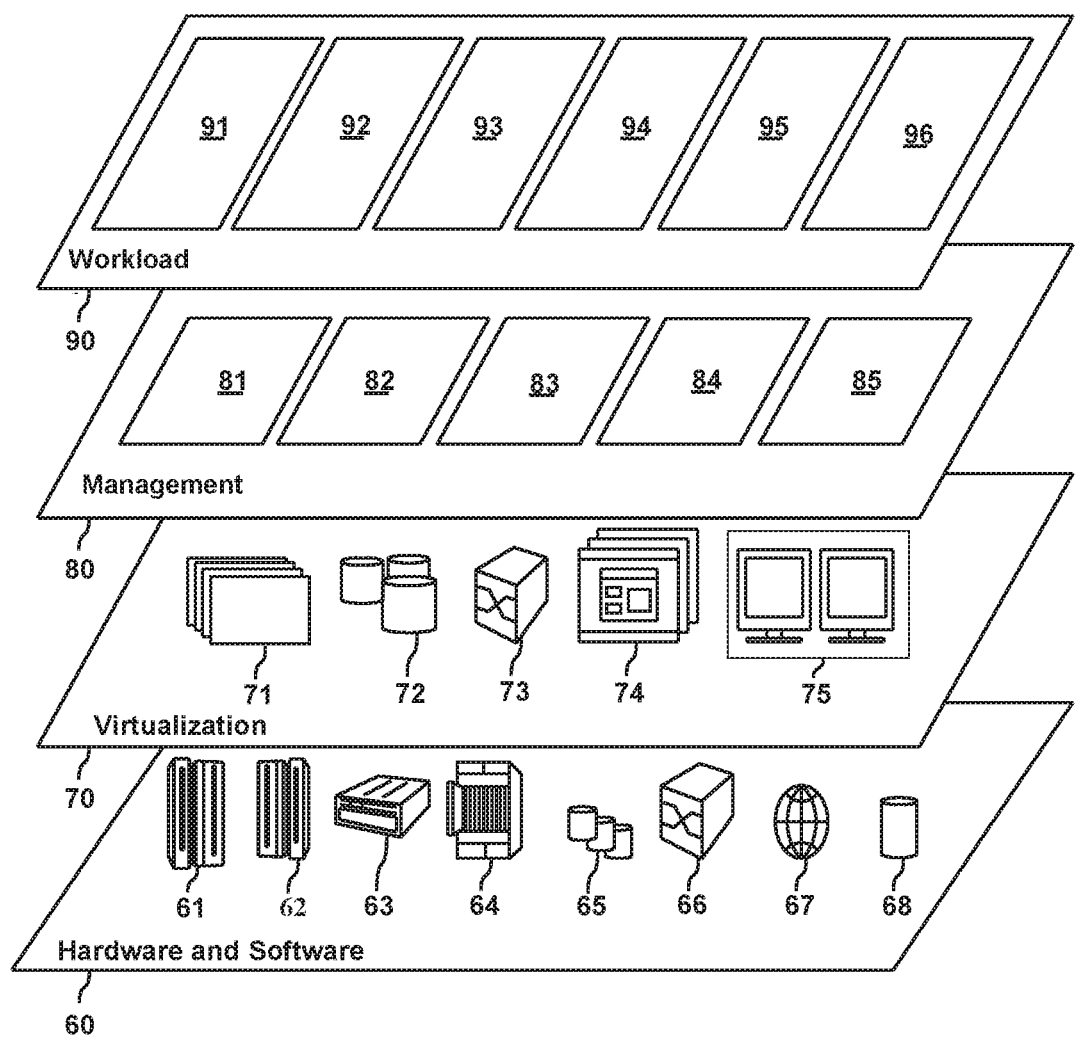
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and test case selection 96. Hereinafter, reference will be made to FIGS. 4-5 to describe details of the test case selection 96.

As described above, as software is updated or changed constantly, software test plays an important role in ensuring software quality. There are often thousands of test cases for testing software. Due to time and resource constraints, it is usually impossible to run all of the test cases in every software test. Since one test case only covers a narrow test scope, it is desirable to select, for a software test, test cases having the minimum time and resource consumption but covering a sufficient test scope.

Regression testing is an important and costly process in software testing. It means that after modifying a software program, part or all of the test cases should be run repeatedly to ensure that the modification does not introduce any new bug. Conventional regression testing has several drawbacks. For example, it will take a long period to launch a test with thousands of test cases if no test scope is specified. Therefore, it is difficult to fulfill requirements of continuous integration and delivery. Conventional regression testing is usually divided into smoke testing and full testing. Its test scope is usually defined by a test engineer when creating test cases, which will hardly be re-defined. If the test engineer lacks experience, it is difficult for him/her to select suitable test cases for regression testing from thousands of test cases.

Some existing solutions can obtain code coverage information of test cases by running all of the test cases and then select test cases for regression testing based on the code coverage information. However, when the code of the software is updated, the code coverage information needs to be updated by re-running all of the test cases, which would be time consuming. Moreover, the code coverage information of a test case can only show which functions are called by the test case. Other factors related to the test case will not be considered in the test case selection, such as, the execution environment, the targeted software module, the number of threads, an order of operations or so on.

In order to at least partially solve the above and other potential problems, embodiments of the present invention provide a solution for test case selection. This solution can automatically select test cases similar to a candidate test case from a number of test cases without running any test case in advance. For example, the candidate test case may be a test case that failed in a past software test due to a software bug. After modifying the software to fix the bug, it is expected to re-test the candidate test case and to test its similar test cases that might be affected by the bug to verify if the bug is fixed or not. By automatically selecting suitable test cases for regression testing, the effectiveness and efficiency of software testing can be greatly improved.

Figure 4:
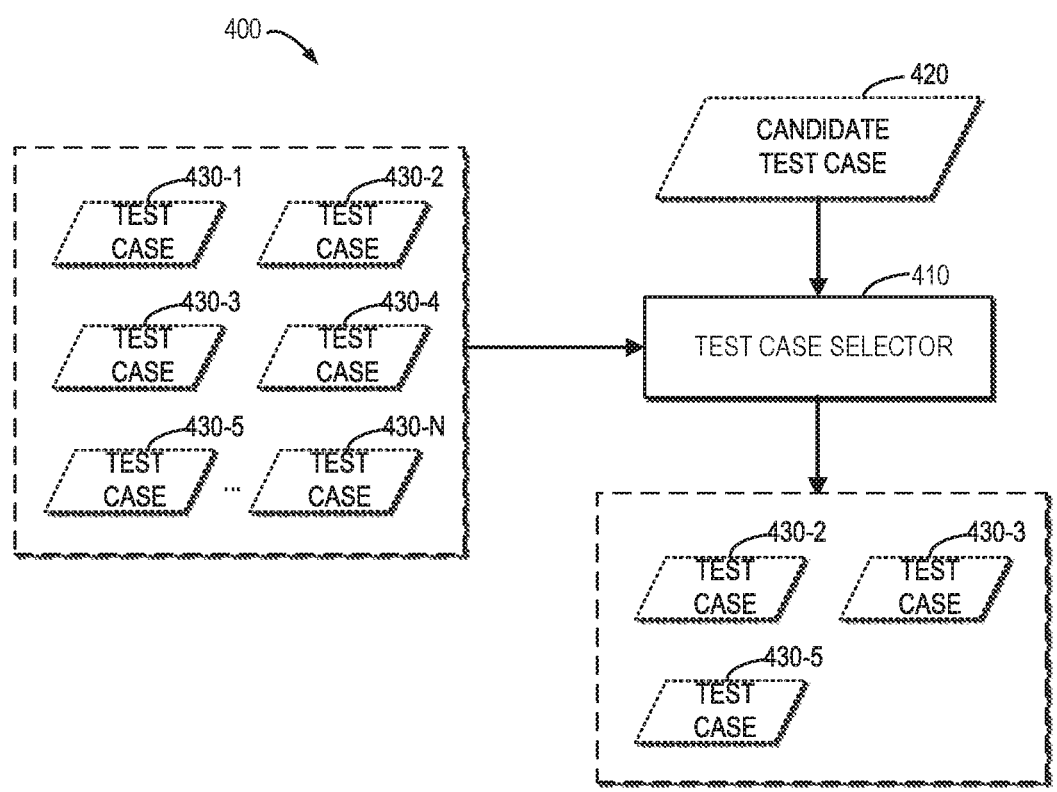
FIG. 4 depicts a system according to embodiments of the present invention.

With reference now to FIG. 4, a system 400 in which embodiments of the present invention can be implemented is shown. It is to be understood that the structure and functionality of system 400 are described only for the purpose of illustration without suggesting any limitations as to the scope of the present invention. The embodiments of the present invention can be embodied with a different structure and/or functionality. For example, at least part or all of system 400 may be implemented by computer system/server 12 of FIG. 1.

System 400 comprises a test case selector 410. For example, test case selector 410 may be implemented by computer system/server 12 of FIG. 1. As shown in FIG. 4, test case selector 410 may receive candidate test case 420 and a set of test cases 430-1, 430-2 . . . 430-N (collectively or individually referred to as "test cases 430"). For example, candidate test case 420 may be a test case that failed in a past software test due to a software bug. After modifying software to fix the bug, it is expected to re-test candidate test case 420 and to test its similar test cases that might be affected by the bug to verify if the bug is fixed or not. For another example, candidate test case 420 may be any test case that has been selected for software testing. It is expected to find some test cases similar to the candidate test case to enhance the effectiveness of software test.

As shown in FIG. 4, for example, test case selector 410 may select, from the set of test cases 430, test cases 430-2, 430-3 and 430-5 which are similar to candidate test case 420.

Figure 5:
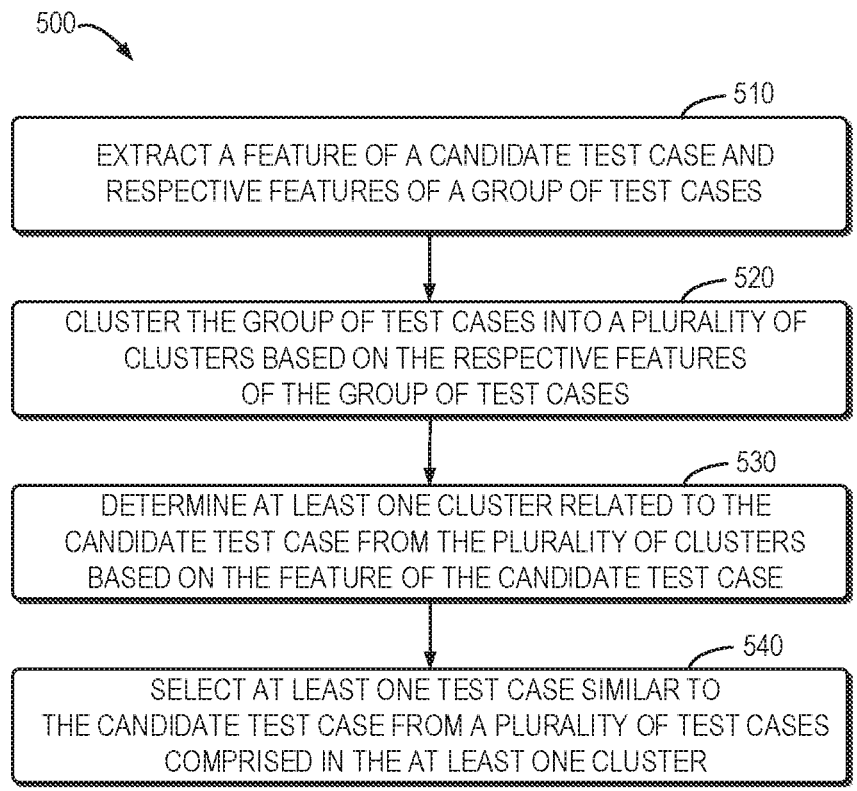
FIG. 5 depicts a flowchart of an example method for test case selection according to embodiments of the present invention.

FIG. 5 depicts a flowchart of an example method 500 for test case selection according to embodiments of the present invention. For example, method 500 may be implemented at test case selector 410 shown in FIG. 4 for selecting test cases 430-2, 430-3 and 430-5. It is to be understood that method 500 may also comprise additional blocks (not shown) and/or may omit the illustrated blocks. The scope of the present invention described herein is not limited in this aspect.

At block 510, test case selector 410 extracts a feature of a candidate test case 420 and respective features of a set of test cases 430.

In some embodiments, for candidate test case 420 or each of test cases 430, test case selector 410 may extract original values of a set of feature elements from a test case and generate a feature vector for the test case based on the extracted original values of the feature elements.

In some embodiments, the set of feature elements may include indicators or factors that can be applicable for distinguishing a test case from other test cases. For example, the set of feature elements may include but be not limited to an environment for executing the test case, a software module targeted by the test case, input settings of the test case, an order of operations in the test case and the like.

Table 1 illustrates the original values of feature elements extracted from each of test cases 430 and candidate test case 420. It is to be understood that an original value of a feature element can be numeric or not numeric. Original values of a same feature element corresponding to different test cases can be the same with or different from each other.

TABLE 1

Feature elements extracted from candidate test case 420 and test cases 430

| Test Case | Element 1 | Element 2 | Element 3 | Element 4 | . . . |
|---|---|---|---|---|---|
| 420 | E1_V1 | E2_V1 | E3_V1 | E4_V1 | . . . |
| 430-1 | E1_V2 | E2_V2 | E3_V2 | E4_V2 | . . . |
| 430-2 | E1_V3 | E2_V3 | E3_V3 | E4_V3 | . . . |
| 430-3 | E1_V4 | E2_V4 | E3_V4 | E4_V4 | . . . |
| 430-4 | E1_V5 | E2_V5 | E3_V5 | E4_V5 | . . . |
| . . . | . . . | . . . | . . . | . . . | . . . |
| 430-N | E1_V6 | E2_V6 | E3_V6 | E4_V6 | . . . |

In some embodiments, in order to generate a feature vector for the test case (for example, candidate test case 420 or any of test cases 430), test case selector 410 may perform data transformation on the original values of the set of feature elements extracted from the test case.

In some embodiments, the set of feature elements may include a categorical feature element, whose original value may be one of several predefined possible values. In some embodiments, if the number of the predefined possible values is not greater than 2, the original value of the categorical feature element can be transformed into 0 or 1. If the number of the predefined possible values is greater than 2, the original value of the categorical feature element can be transformed into a binary string. For example, if there are three possible environments A, B and C for executing a test case, the environment for executing the test case can be regarded as a categorical feature element, whose original value may be A, B or C. In this event, for example, the value A can be encoded as a binary string '100', the value B can be encoded as a binary string '010' and the value C can be encoded as a binary string '001'. If it is determined that the original value of the categorical feature element is A (that is, the environment for executing the test case is A), test case selector 410 may transform the original value of the categorical feature element into '100'. It is to be understood that the above example is shown merely for the purpose of illustration, without suggesting any limitation as to the scope of the present invention. In other embodiments, test case selector 410 may transform the original value of a categorical feature element into other numeric data than a binary string.

In some embodiments, the set of feature elements may include a feature element having a continuous value range, which is also called "continuous feature element" in the text. In this event, in order to facilitate subsequent processing, test case selector 410 may normalize the original value of the continuous feature element into a predetermined value range, for example, [0, 1].

In some embodiments, the set of feature elements may include a feature element whose original value cannot be directly transformed into numeric data. For example, the feature element can neither be regarded as a categorical feature element nor as a continuous feature element. In this event, test case selector 410 may extend the feature element with one or more categorical or continuous feature elements associated with the feature element. For example, if the data type to be processed by the test case is a user name, then "user name" can be regarded as a feature element, which is neither a categorical feature element nor a continuous feature element and cannot be directly transformed into numeric data. In this event, for example, the test case selector 410 can extend the feature element "user name" with other associated feature elements, such as "user gender", "user salary", "number of children" and/or the like.

In this way, the test case selector 410 can vectorize the feature elements extracted from each of test cases 430 and candidate test case 420 and generate, for each of test cases 430 and candidate test case 420, a feature vector which includes the transformed values of the set of feature elements. In the following, the terms "feature" and "feature vector" can be used interchangeably.

At block 520, test case selector 410 clusters the set of test cases 430 into a plurality of clusters based on the respective features of the set of test cases 430.

In some embodiments, test case selector 410 may cluster the set of test cases 430 into a plurality of clusters by using any suitable clustering algorithm or model that is currently known or to be developed in the future. In some embodiments, if the set of test cases 430 is updated, for example, by adding some new test cases or by removing some old test cases, test case selector 410 may re-cluster the updated set of test cases 430 into clusters by using the clustering algorithm or model.

At block 530, test case selector 410 determines at least one cluster related to candidate test case 420 from the plurality of clusters based on the feature of candidate test case 420.

In some embodiments, test case selector 410 may determine one of the plurality of clusters which candidate test case 420 belongs to, by scoring candidate test case 420 based on the feature of candidate test case 420. For example, the feature of candidate test case 420 can be input to the clustering algorithm or model for scoring, so as to determine the cluster which the candidate test case 420 belongs to.

Alternatively, in some embodiments, test case selector 410 may receive a user input indicating a search range parameter. For example, the search range parameter may indicate a first threshold, where a ratio of the number of test cases comprised in the at least one cluster to the number of test cases comprised in the set of test cases should exceed the first threshold. In this event, test case selector 410 may determine a distance between a center of each of the plurality of clusters and candidate test case 420. For example, the distance between the center of each of the plurality of clusters and candidate test case 420 can be provided by the clustering algorithm or model. The distance may indicate an average similarity between candidate test case 420 and test cases comprised in the each of the plurality of clusters. Test case selector 410 may order the plurality of clusters based on their distances from candidate test case 420. Test case selector 410 may then select, from the ordered clusters, the at least one cluster with the shortest distance, such that a ratio of the number of test cases comprised in the at least one cluster to the number of test cases comprised in the set of test cases exceeds the first threshold indicated by the user input.

For example, it is assumed that the set of test cases 430 includes 5000 test cases in total and top 3 clusters include 15, 25 and 35 test cases respectively. If the first threshold is 0.5%, test case selector 410 may select top 2 clusters that include 40 test cases in total (where 40/5000>0.5%). If the first threshold is 1%, test case selector 410 may select top 3 clusters that include 75 test cases in total (where 75/5000>1%).

At block 540, test case selector 410 selects, from a plurality of test cases comprised in the at least one cluster, at least one test case (for example, test cases 430-2, 430-3 and 430-5) similar to candidate test case 420.

In some embodiments, test case selector 410 may determine respective similarities between test cases comprised in the at least one cluster and candidate test case 420, based on the feature of candidate test case 420 and respective features of the test cases comprised in the at least one cluster. Test case selector 410 may select the at least one test case similar to candidate test case 420 based on the respective similarities.

Table 2 illustrates the features of candidate test case 420 and test cases 430 comprised in the at least one cluster. Here, it is assumed that the at least one cluster comprises test cases 430-2, 430-3, 430-4 and 430-5 as shown in FIG. 4. It can be seen from Table 2 that, the feature of each test case includes the transformed values of the set of feature elements extracted from the test case. For the purpose of following discussion, Table 2 also shows historical execution time of each of the test cases 430.

TABLE 2

Features of candidate test case 420 and test cases 430

| Test Case | Element 1 | Element 2 | Element 3 | Element 4 | Historical Execution Time |
|---|---|---|---|---|---|
| 420 | 1 | 1 | 0 | 0 | — |
| 430-2 | 1 | 1 | 0 | 0.5 | T1 |
| 430-3 | 1 | 0 | 0 | 0.29 | T2 |
| 430-4 | 1 | 0 | 0 | 0.51 | T3 |
| 430-5 | 1 | 0 | 1 | 1.0 | T4 |

In some embodiments, in order to determine a similarity between candidate test case 420 and a test case 430, test case selector 410 may determine a distance (such as, Euclidean distance) between their feature vectors. For example, the Euclidean distance between test case 430-2 and candidate test case 420 can be determined as: $\sqrt{(1-1)^2+(1-1)^2+(0-0)^2+(0.5-0)^2}=0.5$. The Euclidean distance between test case 430-3 and candidate test case 420 can be determined as: $\sqrt{(1-1)^2+(0-1)^2+(0-0)^2+(0.29-0)^2}=1.04$. Similarly, the Euclidean distance between test case 430-4 and candidate test case 420 can be determined as: $\sqrt{(1-1)^2+(0-1)^2+(0-0)^2+(0.51-0)^2}=1.12$. The Euclidean distance between test case 430-5 and candidate test case 420 can be determined as: $\sqrt{(1-1)^2+(0-1)^2+(1-0)^2+(1-0)^2}=1.732$.

In some embodiments, test case selector 410 may determine the similarity between candidate test case 420 and test case 430 by reversing and normalizing their Euclidean distance. In some embodiments, in order to make the minimum similarity not zero, an upper boundary for normalizing the Euclidean distances can be a sum of the maximum Euclidean distance (that is, 1.732) and a predetermined base value (such as, 0.001). For example, regarding the above example, the upper boundary for normalizing the Euclidean distances may be 1.733. That is, the similarity between test case 430-2 and candidate test case 420 can be determined as: (1.733−0.5)/[(1.733−0.5)+(1.733−1.04)+(1.733−1.12)+(1.733−1.732)]=(1.733−0.5)/2.540=0.4855. Similarly, the similarity between test case 430-3 and candidate test case 420 can be determined as 0.2728. The similarity between test case 430-4 and candidate test case 420 can be determined as 0.2413. The similarity between test case 430-5 and candidate test case 420 can be determined as 0.0004.

In some embodiments, test case selector 410 may select, from test cases 430 comprised in the at least one cluster, the at least one test case similar to the candidate test case 420 based on the determined similarities and a user specified policy. In some embodiments, the test case selector 410 may receive a user input indicating the user specified policy. For example, the user specified policy may indicate a similarity first policy and/or a test efficiency first policy to be applied in the test case selection.

In some embodiments, if the similarity first policy is indicated by the user input, the user input may also indicate a similarity threshold (also referred to as "second threshold") for selecting test cases. In this event, test case selector 410 may order test cases 430 comprised in the at least one cluster according to their similarities with candidate test case 420. Then, the test case selector 410 may select one or more test cases having the highest similarity with candidate test case 420 from the ordered test cases 430, such that a sum of similarities between the selected test cases and candidate test case 420 exceeds the second threshold.

Alternatively or in addition, in some embodiments, if the test efficiency first policy is indicated by the user input, the user input may also indicate a test efficiency threshold (also referred to as "third threshold") for selecting test cases. In this event, test case selector 410 may determine respective test efficiencies of test cases 430 comprised in the at least one cluster based on their similarities with candidate test case 420 and their historical execution time. For example, the test efficiency of a test case 430 can be determined as a ratio of the similarity between the test case 430 and candidate test case 420 to the historical execution time of the test case 430. Test case selector 410 may order test cases 430 comprised in the at least one cluster according to their test efficiencies. Then, test case selector 410 may select one or more test cases having the highest test efficiency from the ordered test cases 430, such that a sum of test efficiencies between the selected test cases and candidate test case 420 exceeds the third threshold.

It can be seen that, embodiments of the present invention provide a solution for test case selection. This solution can vectorize a test case based on values of feature elements extracted from the test case. This solution can analyze similarities among different test cases based on their feature vectors. This solution can select test cases similar to a candidate test case from a number of test cases according to a user specified policy and their similarities with the candidate test case without running any test case in advance. As such, the selected test cases can fulfill the requirements of similarity and/or test efficiency of regression testing. By automatically selecting suitable test cases for regression testing, the effectiveness and efficiency of software testing can be greatly improved.

It should be noted that the processing of test case selection according to embodiments of this invention could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Definitions for certain terms are provided below:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Comprise/comprises/comprising: As used in the specification (specifically outside of the claims section), this term is intended to be perfectly synonymous with the term "include" and its various conjugated forms (as defined herein in this specification). The term "comprise" (and its various conjugated forms) as used in the claims is to be given its ordinary interpretation that is consistent with patent claim interpretation.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

What is claimed is:

1. A computer-implemented method comprising:
   extracting a feature of a candidate test case and respective features of a set of test cases;
   clustering the set of test cases into a plurality of clusters based on the respective features of the set of test cases;
   determining distances between centers of respective clusters of the plurality of clusters and the candidate test case, wherein the distances indicate an average similarity between the candidate test case and test cases included in respective clusters of test cases;
   ranking the distances by length, smallest to largest, the smallest distance indicating a closest average similarity;
   determining a cluster of the plurality of clusters is related to the candidate test case by selecting the cluster having a distance with the smallest length, wherein a ratio of cluster test cases in the selected cluster to total test cases in the set of test cases exceeds a first threshold; and
   selecting at least one cluster test case similar to the candidate test case from the cluster test cases included in the selected cluster.

2. The method of claim 1, wherein extracting the feature of the candidate test case includes:
   extracting values of a set of feature elements from the candidate test case, wherein the set of feature elements is applicable for distinguishing different test cases; and
   determining the feature of the candidate test case based on the values of the set of feature elements extracted from the candidate test case.

3. The method of claim 2, wherein extracting the respective features of the set of test cases includes:

extracting values of the set of feature elements from each of the set of test cases; and determining the respective features of the set of test cases based on the values of the set of feature elements extracted from each of the set of test cases.

4. The method of claim 1, further includes:

receiving a user input indicating the first threshold.

5. The method of claim 1, wherein the selecting at least one test case similar to the candidate test case includes:

determining respective similarities between the plurality of test cases and the candidate test case based on the feature of the candidate test case and respective features of the plurality of test cases; and selecting the at least one test case from the plurality of test cases based on the respective similarities.

6. The method of claim 5, wherein the selecting the at least one test case from the plurality of test cases includes:

ordering the plurality of test cases based on the respective similarities; and selecting the at least one test case from the ordered test cases, wherein a sum of the similarities between the at least one test case and the candidate test case exceeds a second threshold.

7. The method of claim 6, further including:

receiving a user input indicating the second threshold.

8. The method of claim 5, wherein the selecting the at least one test case from the plurality of test cases includes:

determining respective test efficiencies of the plurality of test cases based on the respective similarities and respective historical execution time of the plurality of test cases;

ordering the plurality of test cases based on the respective test efficiencies; and selecting the at least one test case from the ordered test cases, wherein a sum of the test efficiencies of the at least one test case exceeds a third threshold.

9. The method of claim 8, further including:

receiving a user input indicating the third threshold.

10. A computer system comprising:

a processor(s) set;

a machine readable storage device; and computer code stored on the machine readable storage device, with the computer code including instructions and data for causing the processor(s) set to perform operations including the following:

extracting a feature of a candidate test case and respective features of a set of test cases, clustering the set of test cases into a plurality of clusters based on the respective features of the set of test cases, determining distances between centers of respective clusters of the plurality of clusters and the candidate test case, wherein the distances indicate an average similarity between the candidate test case and test cases included in respective clusters of test cases, ranking the distances by length, smallest to largest, the smallest distance indicating a closest average similarity, determining a cluster of the plurality of clusters is related to the candidate test case by selecting the cluster having a distance with the smallest length, wherein a ratio of cluster test cases in the selected cluster to total test cases in the set of test cases exceeds a first threshold, and selecting at least one cluster test case similar to the candidate test case from the cluster test cases included in the selected cluster.

11. The computer system of claim 10, wherein extracting the feature of the candidate test case includes:

extracting values of a set of feature elements from the candidate test case, wherein the set of feature elements is applicable for distinguishing different test cases; and determining the feature of the candidate test case based on the values of the set of feature elements extracted from the candidate test case.

12. The system of claim 11, wherein extracting the respective features of the set of test cases includes:

extracting values of the set of feature elements from each of the set of test cases; and determining the respective features of the set of test cases based on the values of the set of feature elements extracted from each of the set of test cases.

13. The system of claim 10, wherein the actions further include:

receiving a user input indicating the first threshold.

14. The system of claim 10, wherein the selecting at least one test case similar to the candidate test case includes:

determining respective similarities between the plurality of test cases and the candidate test case based on the feature of the candidate test case and respective features of the plurality of test cases; and selecting the at least one test case from the plurality of test cases based on the respective similarities.

15. The system of claim 14, wherein the selecting the at least one test case from the plurality of test cases includes:

ordering the plurality of test cases based on the respective similarities; and selecting the at least one test case from the ordered test cases, wherein a sum of the similarities between the at least one test case and the candidate test case exceeds a second threshold.

16. The system of claim 15, further includes:

receiving a user input indicating the second threshold.

17. The system of claim 14, wherein the selecting the at least one test case from the plurality of test cases includes:

determining respective test efficiencies of the plurality of test cases based on the respective similarities and respective historical execution time of the plurality of test cases;

ordering the plurality of test cases based on the respective test efficiencies; and selecting the at least one test case from the ordered test cases, wherein a sum of the test efficiencies of the at least one test case exceeds a third threshold.

18. A computer program product comprising:

a machine readable storage device; and computer code stored on the machine readable storage device, with the computer code including instructions and data for causing a processor(s) set to perform operations including the following:

extracting a feature of a candidate test case and respective features of a set of test cases, clustering the set of test cases into a plurality of clusters based on the respective features of the set of test cases, determining distances between centers of respective clusters of the plurality of clusters and the candidate test case, wherein the distances indicate an average similarity between the candidate test case and test cases included in respective clusters of test cases, ranking the distances by length, smallest to largest, the smallest distance indicating a closest average similarity, determining a cluster of the plurality of clusters is related to the candidate test case by selecting the cluster having a distance with the smallest length, wherein a ratio of cluster test cases in the selected cluster to total test cases in the set of test cases exceeds a first threshold, and selecting at least one cluster test case similar to the candidate test case from the cluster test cases included in the selected cluster.

19. The computer program product of claim 18, wherein extracting the feature of the candidate test case includes:

extracting values of a set of feature elements from the candidate test case, wherein the set of feature elements is applicable for distinguishing different test cases, and determining the feature of the candidate test case based on the values of the set of feature elements extracted from the candidate test case.

20. The computer program product of claim 18, wherein selecting at least one cluster test case similar to the candidate test case includes:

determining respective similarities between the plurality of test cases and the candidate test case based on the feature of the candidate test case and respective features of the plurality of test cases, and selecting the at least one test case from the plurality of test cases based on the respective similarities.

* * * * *